United States Patent
Weck et al.

(10) Patent No.: US 6,910,505 B2
(45) Date of Patent: Jun. 28, 2005

(54) COILED HOSE

(75) Inventors: David Weck, Miami, FL (US); Erwin Frey, Ft. Lauderdale, FL (US); Edson A. Mejia, Miami, FL (US)

(73) Assignee: Micasa Trading Corporation, Miami, FL (US)

( * ) Notice: Subject to any disclaimer, the term of this patent is extended or adjusted under 35 U.S.C. 154(b) by 250 days.

(21) Appl. No.: 10/120,482

(22) Filed: Apr. 12, 2002

(65) Prior Publication Data

US 2003/0192611 A1 Oct. 16, 2003

(51) Int. Cl.$^7$ ................................................. F16L 11/00
(52) U.S. Cl. ...................... 138/109; 138/118; 138/119; 138/121; 138/DIG. 11
(58) Field of Search ................................ 138/121, 109, 138/119, 118, DIG. 11; 239/195

(56) References Cited

U.S. PATENT DOCUMENTS

| | | | | | |
|---|---|---|---|---|---|
| 125,596 | A | * | 4/1872 | Mayall | 138/118 |
| 2,814,529 | A | * | 11/1957 | Arnt | 239/208 |
| 3,021,871 | A | | 2/1962 | Rodgers | |
| 3,610,289 | A | | 10/1971 | Moss | |
| 3,939,875 | A | * | 2/1976 | Osborn et al. | 138/178 |
| 3,996,968 | A | * | 12/1976 | Bergman et al. | 138/118 |
| 4,234,427 | A | * | 11/1980 | Boehme | 210/198.2 |
| 4,275,761 | A | * | 6/1981 | Waldhauser | 137/595 |
| 4,478,661 | A | * | 10/1984 | Lewis | 156/92 |
| 4,582,257 | A | * | 4/1986 | Siegler | 239/197 |
| 4,846,794 | A | | 7/1989 | Hertzer | |
| 5,060,697 | A | * | 10/1991 | Weinheimer | 138/121 |
| 5,617,737 | A | * | 4/1997 | Christensen et al. | 62/487 |
| 5,895,695 | A | * | 4/1999 | Rowley | 428/36.9 |
| 5,906,226 | A | * | 5/1999 | Goodman | 138/109 |
| 5,964,412 | A | | 10/1999 | Thomas | |
| 6,029,711 | A | * | 2/2000 | Koch et al. | 138/118 |
| 6,098,666 | A | * | 8/2000 | Wells et al. | 138/115 |
| 6,209,800 | B1 | | 4/2001 | Thomas | |
| 6,390,157 | B1 | | 5/2002 | Moogdaharn et al. | |
| 6,675,835 | B2 | * | 1/2004 | Gerner et al. | 138/30 |
| 6,736,803 | B2 | * | 5/2004 | Cawood | 604/327 |
| 2001/0010339 | A1 | | 8/2001 | Thomas | |
| 2002/0000720 | A1 | | 1/2002 | Knowles | |

FOREIGN PATENT DOCUMENTS

DE   28 37 802 A   8/1979
EP   0 359 688 A   3/1990

OTHER PUBLICATIONS

Freelin Wade Company, Plastic Tubing Catalogue, 1730 Miller Street, McMinnville, Oregon (noted Mar. 1996).
"Watering Accessories," Charlie's Greenhouse Supply catalog, 1996.

* cited by examiner

Primary Examiner—James Hook
(74) Attorney, Agent, or Firm—Lowe, Hauptman & Berner, LLP

(57) ABSTRACT

A water hose includes a helically shaped coiled tube having interior and exterior elliptical cross-sections with a flexural modulus greater than the flexural modulus of a coiled tube having interior and exterior circular cross-sections and the same neutral center line length as the elliptical cross-sections, but otherwise having the same properties as the elliptical cross-sections. The tube is made of extruded plastic resin having a durometer hardness measurement approximately in the range of 70–80 Shore A and has on its periphery ridges extending longitudinally at right angles to the elliptical cross-sections. In first and second embodiments, the elliptical cross-sections have major and minor axes respectively extending in the direction of the coil longitudinal axis and in planes extending at right angles to the longitudinal axis, and vice versa.

23 Claims, 2 Drawing Sheets

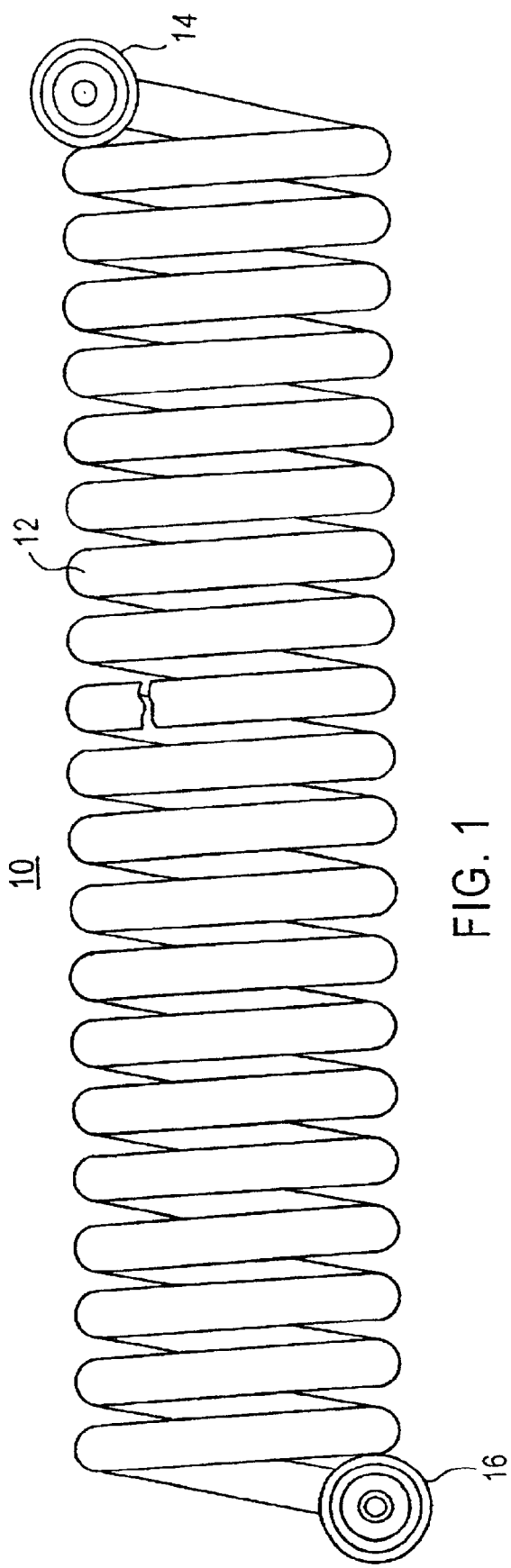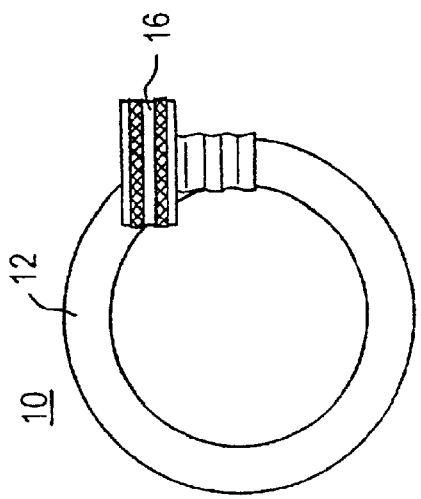

COILED HOSE

FIELD OF INVENTION

The present invention relates generally to hoses and more particularly to a hose having a coiled tube with an elliptical cross-section. Another aspect of the invention relates to a hose having a coiled tube with a cross-sectional shape causing the tube to have a flexural modulus greater than the flexural modulus of a coiled tube having a circular cross-section, wherein the coiled tubes are otherwise the same. An additional aspect of the invention relates to a hose having a coiled tube with longitudinally extending ridges on its peripheral surface.

BACKGROUND ART

Water hoses having extruded polyurethane resin or polyvinyl chloride resin helically coiled tubes with cross-sections having circular interior and exterior surfaces are commercially available. The tubes are coiled to enable the hoses, when stored, to have adjacent abutting or substantially abutting turns. In use, one end of such a hose is connected to a standard faucet and a user pulls on the other end of the hose, causing the adjacent abutting turns to become spaced from each other, resulting in partial uncoiling of the tube. Upon release by the user, the tube again becomes tightly coiled so that adjacent turns again abut or substantially abut. Hoses having such tubes are considered desirable because of the ease with which they are stored and the small amount of space they occupy during storage.

Such hoses having extruded polyvinyl chloride resin helically coiled tubes have greater flexure than hoses having extruded polyurethane resin coiled tubes with otherwise identical properties. The greater flexure of the polyvinyl chloride tubes enables the polyvinyl chloride tubes to be uncoiled more easily than the polyurethane resin tubes. In addition, tubes made of polyvinyl chloride resin are less expensive than tubes made of polyurethane resin. However, a disadvantage of helically coiled polyvinyl chloride resin tubes relative to hectically coiled polyurethane tubes is that the helix of a polyvinyl chloride resin tube must have a relatively small diameter to provide the tube with a sufficiently large flexural modulus to maintain the adjacent turns of the tube in an abutting relationship. (Flexural modulus is also referred to as flexural rigidity; it is a constant indicative of the ability of a structure to bend; flexural modulus is equal to the Young's modulus of the material in the structure times the moment of inertia of the structure; it is also equal to the square of the radius of gyration of a cross-section of the structure perpendicular to the plane in which the structure is being bent.) In fact, the commercially available hoses having polyvinyl chloride resin helically coiled tubes, when stored, have adjacent turns that frequently do not abut or even substantially abut so that such hoses cannot be stored in an optimum, minimum space condition.

To achieve abutment of adjacent turns during storage, the commercially available hoses with extruded polyurethane resin helically coiled tubes apparently must have circular inner diameters in the range of 0.0125 to 0.375 inch and circular outer diameters in the range of 0.245 to 0.5625 inch; in addition the windings of the helical coils apparently must have an inner diameter in the range of 0.5 to 2.5 inches and be made of polyurethane having a durometer hardness measurement in the range of 85 to 98 Shore A; see U.S. Pat. Nos. 5,964,412 and 6,209,800. However, such tubes are difficult to uncoil because they have such a large hardness measurement. In addition, these hoses, when stored, are somewhat long because the windings of the helical coil have a maximum inner diameter of 2.5 inches.

It is, accordingly, an object of the present invention to provide a new and improved hose including a coiled tube.

Another object of the invention is to provide a new and improved liquid dispensing hose including a coiled tube, wherein the hose is relatively easy to uncoil and which returns to a substantially recoiled condition, with adjacent turns in abutting or substantially abutting relationship.

An additional object of the invention is to provide a new and improved liquid dispensing hose including a coiled tube, wherein the hose is relatively easy to uncoil and has a relatively short length when stored.

A further object of the invention is to provide a new and improved water hose including a coiled tube having an exterior construction arranged to resist wear of the tube as the tube is pulled along the ground and which is stiffer than coiled tube hoses which are otherwise the same.

SUMMARY OF THE INVENTION

According to one aspect of the invention a hose includes a coiled tube having elliptical interior and exterior cross-sections for at least a substantial part of the length of the tube.

Preferably, the tube has elliptical cross-sections with major and minor axes such that the tube has a flexural modulus greater than the flexural modulus of a coiled tube having (a) a circular cross-section, (b) the same material as the coiled tube of the hose, (c) a neutral center line length equal to the equal neutral center line length of the elliptical cross-sections, and (d) a wall thickness equal to the wall thickness of the elliptical cross-sections. (A neutral center line of a tube having an elliptical or circular cross section is an elliptical or circular line located one-half of the way between the peripheries of the interior and exterior cross-sectional surfaces of the tube.) The ratio of the lengths of the major axis to the minor axis of the neutral center line of the elliptical cross-sections is in the range of 1.01 to about 2.1 to achieve this result. The greatest flexural modulus is provided when the ratio of the neutral center line of the elliptical cross-section to the neutral center line of the circular cross-section is equal to about 1.4.

Another aspect of the invention relates to a hose including a coiled tube having interior cross-sections having a predetermined neutral center line length and a predetermined noncircular cross-sectional shape for at least a substantial part of the length of the tube. The predetermined noncircular cross-sectional shape causes the tube to have a flexural modulus greater than the flexural modulus of a portion of a coiled tube having interior circular cross-sections with the predetermined neutral center line length, and otherwise having the same properties as the coiled tube of the hose.

Preferably, the coiled tube has a helical shape and is made of polyvinyl chloride resin having a durometer hardness measurement approximately in the range of 70–80 Shore A. The helix has turns with circular cross-sections, preferably three inches in diameter. Three inches has been found to be an optimum diameter for maintaining the helical shape and substantially full recoil of polyvinyl chloride resin tubes having exterior surface major and minor semi-axes of 8.02 and 3.89 mm and interior surface major and minor semi-axes of 6.43 and 2.30 mm; these lengths of the semi-axis enable the greatest flexural modulus to be attained for a hose having an elliptical neutral center line length equal to the neutral center line length of a circular hose having a ⅜ inch inner diameter.

In first and second preferred embodiments, the elliptical cross-sections have major and minor axes respectively extending in the direction of the helix longitudinal axis and in planes extending at right angles to the helix longitudinal axis, and vice versa.

An additional aspect of the invention concerns a hose including a coiled tube having longitudinally extending ridges on its peripheral surface. The ridges have the advantages of (1) increasing abrasion resistance of the tube exterior surface, (2) maintaining the helical shape and full recoil condition during hose storage, (3) reducing material costs, and (4) reducing weight.

The above and still further objects, features and advantages of the present invention will become apparent upon consideration of the following detailed descriptions of several specific embodiments thereof, especially when taken in conjunction with the accompanying drawings.

BRIEF DESCRIPTION OF THE DRAWING

FIG. 1 is a top view of a hose including a coiled tube, in accordance with preferred embodiments of the present invention;

FIG. 2 is a front view of the hose of FIG. 1;

DETAILED DESCRIPTION OF THE DRAWING

Figure 3:
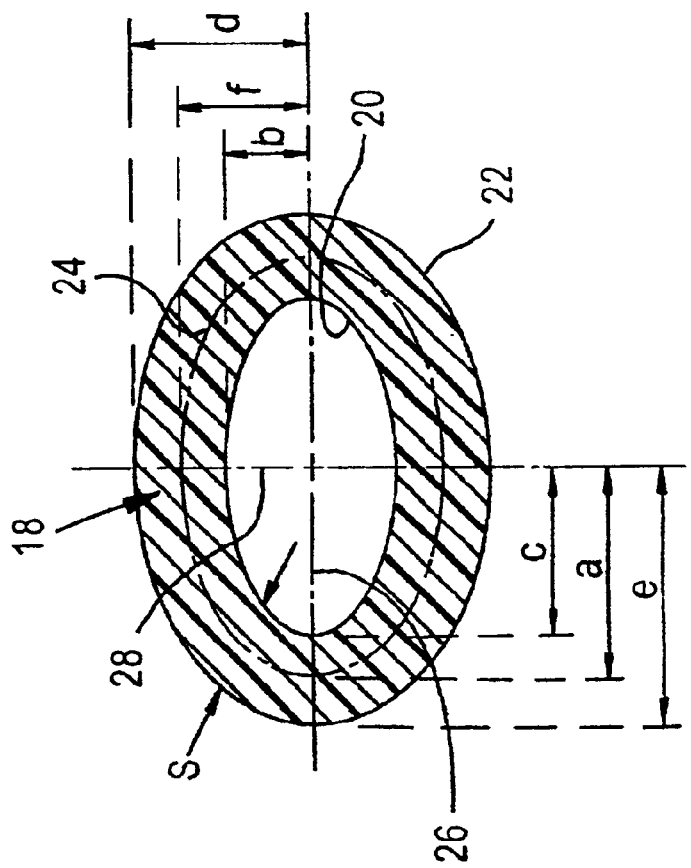
FIG. 3 is a cross-sectional view of one preferred embodiment of the coiled tube of the hose of FIGS. 1 and 2.

Reference is now made to FIGS. 1–3 of the drawing wherein water hose 10 is illustrated as including flexible, helically coiled tube 12 having male and female connectors 14 and 16 respectively connected to opposite ends of the tube. Male and female connectors 14 and 16 are of the conventional type, respectively adapted to be connected to standard domestic outdoor faucets and water dispensing structures, such as nozzles, sprayers and sprinklers.

Figure 4:
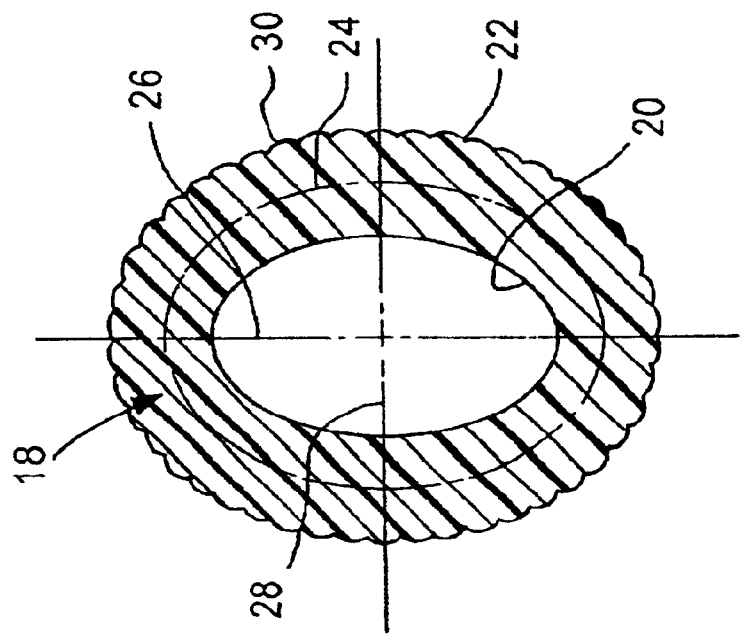
FIG. 4 is a cross-sectional view of a second preferred embodiment of the coiled tube of the hose of FIGS. 1 and 2.

Tube 12, preferably made of extruded plastic resin (preferably polyvinyl chloride) having a durometer hardness measurement approximately in the range of 70–80 Shore A, has elliptical cross-sections in planes at right angles to the direction of flow through the tube, as illustrated in FIGS. 3 and 4. The resin includes known pigments which inhibit sunlight deterioration of tube 12. The helical windings of tube 12 are substantially circular throughout the length of the tube, as illustrated in FIG. 2. When tube 12 is stored, adjacent pairs of the helical windings abut or substantially abut.

Tube 12 has elliptical cross-sections throughout its length, except at its ends where the tube is connected to connectors 14 and 16, at which points the tube has circular cross-sections. Tube 12 is sufficiently pliable that the portions of extruded elliptical cross-sections connected to connectors 14 and 16 are deformed into circular cross-sections when the connectors are attached to the tube in a conventional manner.

As illustrated in FIG. 3, tube 12 has a wall 18 with a thickness (S) that is the same around the entire cross-section of the tube and is the same throughout the length of the tube. Tube 18 has elliptical interior and exterior surfaces 20 and 22, respectively, and an elliptical neutral center line 24; elliptical neutral center line 24 is half way between interior and exterior elliptical surfaces 20 and 22. Interior and exterior surfaces 20 and 22 and neutral center line 24 are ellipses having coincident major and minor axes 26 and 28, respectively, such that the lengths of the major semi-axes of surfaces 20 and 22 and neutral center line 24 are respectively represented by c, e and a, while the lengths of the minor semi-axes of surfaces 20 and 22 and neutral center line 24 are respectively represented by b, d and f.

It can be shown mathematically that tubes with elliptical cross-sections having ratios of major to minor axes lengths between 1.01 and approximately 2.1 have flexural moduli greater than tubes with circular cross-sections, for otherwise common properties, that is, wherein the tubes with elliptical and circular cross-sections have: (1) neutral center lines of the same length, (2) are made of the same material and (3) have walls of the same thickness. Tubes with elliptical cross-sections having ratios of major to minor axes lengths in excess of approximately 2.1 have flexural moduli less than tubes with circular cross-sections for otherwise common properties. It can also be shown mathematically that tubes having elliptical cross-sections have the greatest flexural modulus if the ratio of major to minor axes lengths of the neutral center line of such tubes is approximately 1.4. Tubes having elliptical cross-sections with neutral center lines having major to minor axes ratios of approximately 1.4 have a flexural modulus which is about 5.6 percent greater than the flexural modulus of circular cross-section tubes having the same properties.

The tube illustrated in FIG. 3 is coiled over the major axis of the tube. In other words, major axis 26 extends in the same direction as the longitudinal axis of the helical turns of tube 12, that is, in the direction of the tube between the opposite ends of the tube. This has the advantage of enabling the tube to be easily extruded and bent over a mandrel to be formed into a helical, that is, coil, shape. It is to be understood, however, that the positions of the major and minor axes of tube 12 can be rotated 90 degrees relative to each other, as illustrated in FIG. 4, so that minor axis 28 extends in same direction as the longitudinal axis of the helical turns of tube 12. Such a configuration is advantageous over the configuration illustrated in FIG. 3 because it increases the flexural modulus of the tube.

A further feature of hose 10, which is applicable to coiled tubes having circular, as well as elliptical cross-sections, is inclusion of ridges 30, FIG. 4. Ridges 30, which are shaped as sectors of a circle, are formed when tube 12 is extruded and are thus made of the same material as the remainder of the tube. The ridges 30 extend outwardly about 3 mm, in the preferred embodiment, from the outer elliptical surface 22 of tube 12. Ridges 30 extend longitudinally about the helical turns of tube 12, that is, the ridges extend in the same direction as the flow of liquid in the helical turns. Ridges 30 increase the abrasion resistance of the exterior surface of tube 12, without adding a significant amount of weight, material or cost to the tube. More importantly, ridges 30 increase the stiffness of tube 12, to further enhance the recoil properties of the helix to assist in causing adjacent turns of the tube to abut or substantially abut while hose 10 is being stored.

Hose 10, in an actually constructed configuration (as illustrated in FIG. 3, but with ridges 30 of FIG. 4) which results in adjacent turns of tube 12 having abutting surfaces during storage, was fabricated from a 25 foot length of extruded plastic resin (preferably polyvinyl chloride) elliptical cross-section tubing having a durometer hardness measurement approximately in the range of 70–80 Shore A. The helical tube, when stored with abutting adjacent turns, has a length of approximately 16½ inches and includes approximately 29½ turns, each having a diameter of approximately three inches (as illustrated in FIG. 2). The major and minor axes are approximately 14.37 and 10.73 mm to achieve the previously discussed optimal flexural modulus. It was found that the three inch turn diameter was also optimal to maintain the coil shape and recoil properties of tube 12. It was found that for diameters substantially in excess of three inches, recoil properties are poorer than for the three inch diameter and that for diameters substantially less than three inches, there is a substantial increase in the amount of force necessary to pull hose 10 to an extended condition. In the extended condition, the distance between connectors 14 and 16 is about 20 feet.

While there have been described and illustrated specific embodiments of the invention, it will be clear that variations in the details of the embodiments specifically illustrated and described may be made without departing from the true spirit and scope of the invention as defined in the appended claims.

We claim:

1. A hose comprising a helically coiled tube made of an extruded plastic resin having a durometer hardness measurement approximately in the range of 70–80 Shore A and having oval interior and exterior cross-sections for at least a substantial part of the length of the tube, the helically coiled tube having a longitudinal axis substantially at a right angle to helical windings of the helically coiled tube and being constructed for causing helical windings of the tube to (1) expand along the longitudinal axis in response to a force being exerted on an end of the tube and (2) recoil in response to the force being released, and a connector for engaging a standard water faucet, the connector being at one end of the tube.

2. The hose of claim 1 wherein the oval cross-sections are elliptical.

3. The hose of claim 2 wherein major and minor axes of the elliptical cross-sections are such that the helically coiled tube has a flexural modulus greater than the flexural modulus of a helically coiled tube having (a) a circular cross-section, (b) the same material as the coiled tube of the hose, (c) a neutral center line length equal to the equal neutral center line length of the elliptical cross-sections, and (d) a wall thickness equal to the wall thickness of the elliptical cross-sections.

4. The hose of claim 3 wherein the coiled tube of the hose has ridges on its peripheral surface, the ridges extending at right angles to the elliptical cross-sections.

5. The hose of claim 1, wherein the helically coiled tube has a longitudinal axis extending between opposite ends of the tube, the elliptical cross-sections having major and minor axes respectively extending in the direction of the longitudinal axis and in planes extending at right angles to the longitudinal axis.

6. The hose of claim 1 wherein the coiled tube of the hose has ridges on its peripheral surface, the ridges extending at right angles to the oval cross-sections.

7. The hose of claim 1 wherein windings of the helix are circular.

8. The hose of claim 7 wherein the windings have a diameter of approximately three inches.

9. The hose of claim 1 wherein the oval cross-sections are oval in planes extending in the same direction as the longitudinal axis, the oval cross sections having major and minor axes respectively extending in the direction of the longitudinal axis and in planes extending at right angles to the longitudinal axis.

10. The hose of claim 1 wherein the oval cross-sections are oval in planes extending in the same direction as the longitudinal axis, the oval cross sections having minor and major axes respectively extending in the direction of the longitudinal axis and in planes extending at right angles to the longitudinal axis.

11. The hose of claim 1 wherein the coiled tube has interior cross-sections having a neutral central line length and a noncircular cross-sectional shape for at least a substantial part of the length of the tube, the noncircular cross-sectional shape causing the tube to have a flexural modulus greater than the flexural modulus of a portion of a coiled tube (a) having interior and exterior circular cross-sections with the neutral center line length and (b) otherwise having properties the same as the coiled tube of the hose.

12. The hose of claim 1 wherein the noncircular cross-sectional shape has transverse and longitudinal extents which differ from each other.

13. The hose of claim 1 wherein the coiled tube of the hose has ridges extending completely around the peripheral surface at right angles to interior cross-sections of the tube.

14. A hose comprising a helically coiled tube having oval interior and exterior cross-sections for at least a substantial part of the length of the tube, the helically coiled tube having a longitudinal axis substantially at a right angle to helical windings of the helically coiled tube and being constructed for causing helical windings of the tube to (1) expand along the longitudinal axis in response to a force being exerted on an end of the tube and (2) recoil in response to the force being released, and a connector for engaging a standard water faucet, the connector being at one end of the tube, wherein the oval cross-sections have a neutral center line with major and minor axes having a length ratio of approximately 1.4.

15. A hose comprising a helically coiled tube having oval interior and exterior cross-sections for at least a substantial part of the length of the tube, the helically coiled tube having a longitudinal axis substantially at a tight angle to helical windings of the helically coiled tube and being constructed for causing helical windings of the tube to (1) expand along the longitudinal axis in response to a force being exerted on an end of the tube and (2) recoil in response to the force being released, and a connector for engaging a standard water faucet, the connector being at one end of the tube, wherein the oval cross-sections have a neutral center line with major and minor axes having length ratios of at least 1.01 and no more than approximately 2.1.

16. A hose comprising a helically coiled tube having oval interior and exterior cross-sections for at least a substantial part of the length of the tube, the helically coiled tube having a longitudinal axis substantially at a right angle to helical windings of the helically coiled tube and being constructed for causing helical windings of the tube to (1) expand along the longitudinal axis in response to a force being exerted on an end of the tube and (2) recoil in response to the force being released, and a connector for engaging a standard water faucet, the connector being at one end of the tube, wherein the helically coiled tube: (a) has circular helical windings approximately three inches in diameter, (b) is made of extruded plastic resin having a durometer hardness measurement approximately in the range of 70–80 Shore A, and (c) the oval cross-sections have exterior surface major and minor semi-axes of 8.02 and 3.89 mm and interior surface major and minor semi-axes of 6.43 and 2.30 mm.

17. A hose comprising a helically coiled tube having oval interior and exterior cross-sections for at least a substantial part of the length of the tube, the helically coiled tube having a longitudinal axis substantially at a right angle to helical windings of the helically coiled tube and being made of extruded plastic resin having a durometer hardness measurement approximately in the range of 70–80 Shore A, the oval cross-sections having a neutral center line with major and minor axes having length ratios of at least 1.01 and no more than approximately 2.1.

18. The hose of claim 17 wherein the oval cross-sections have a neutral center line with major and minor axes having a length ratio of approximately 1.4.

19. The hose of claim 18 wherein the helically coiled tube has circular cross sections approximately three inches in diameter approximately at right angles to the longitudinal axis of helical windings of the helically coiled tube.

20. The hose of claim 18 wherein the helically coiled tube has circular helical windings approximately three inches in diameter, and the oval cross-sections have exterior surface major and minor semi-axes of 8.02 and 3.89 mm and interior surface major and minor semi-axes of 6.43 and 2.30 mm.

21. The hose of claim 17 wherein the helically coiled tube has circular cross sections approximately three inches in diameter approximately at right angles to the longitudinal axis of helical windings of the helically coiled tube.

22. The hose of claim 21 wherein the oval cross-sections have exterior surface major and minor semi-axes of 8.02 and 3.89 mm and interior surface major and minor axes of 6.43 and 2.30 mm.

23. The hose of claim 17 wherein the oval cross sections are elliptical.

* * * * *